United States Patent [19]

Osawa

[11] Patent Number: 4,898,478

[45] Date of Patent: Feb. 6, 1990

[54] LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 364,653

[22] Filed: Jun. 9, 1989

[30] Foreign Application Priority Data

Jun. 17, 1988 [JP] Japan .................................. 63-80229

[51] Int. Cl.$^4$ ............................................. F16C 29/06
[52] U.S. Cl. .................................................... 384/45
[58] Field of Search ............................ 384/45, 43, 44; 464/168

[56] References Cited

U.S. PATENT DOCUMENTS

| 4,582,371 | 4/1986 | Mottate | 384/45 |
| 4,648,726 | 3/1987 | Katahira | 384/45 |
| 4,674,893 | 6/1987 | Teramachi | 384/43 |
| 4,701,057 | 10/1987 | Kashiwabara | 384/43 |

FOREIGN PATENT DOCUMENTS 63-180437 7/1988 Japan .

*Primary Examiner*—Lenard A. Footland
*Attorney, Agent, or Firm*—Basile and Hanlon

[57] ABSTRACT

In each of the ball rolling grooves formed in the side surfaces of a guide rail and in the inner surface of a slider main body a linear guide apparatus, a boundary ridge portion between a groove flank face and a land face is formed in a circular arc shape connecting continuously and smoothly therebetween.

3 Claims, 4 Drawing Sheets

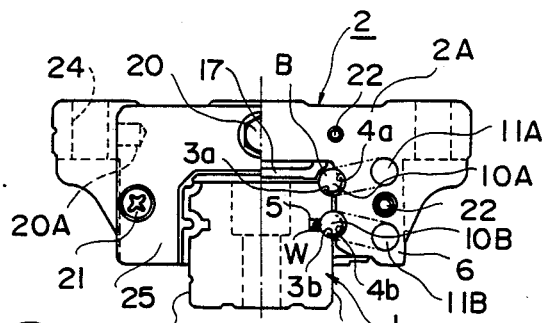
FIG. 1
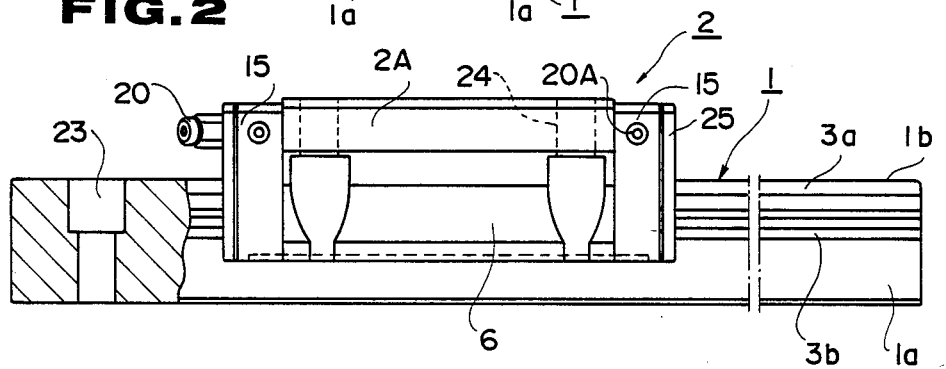
FIG. 2
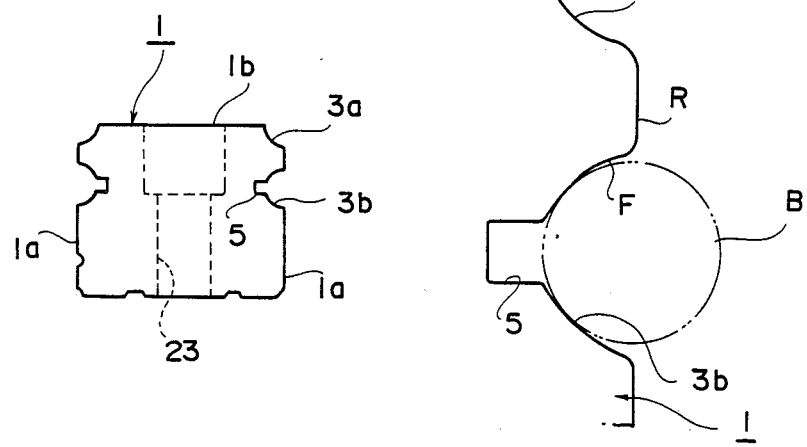
FIG. 3
FIG. 4

LINEAR GUIDE APPARATUS

BACKGROUND OF THE INVENTION

1. Field of the Invention

The present invention relates to a linear guide apparatus including a guide rail and a slider movable on the guide rail through the rolling of balls and, in particular, to the shape of the ball rolling grooves of a linear guide apparatus.

2. Description of the Prior Art

A prior art linear guide apparatus includes, as shown in FIGS. 7 and 8, a guide rail 1 having axially extending ball rolling grooves 3 formed in both side surfaces and a slider 2 movably straddling the guide rail 1 and having ball rolling grooves 4 respectively opposing the ball rolling grooves 3 of the guide rail 1 formed in inner surface of the slider 2. The slider 2 travels axially on the guide rail 1 through the rolling of balls B to thereby carry a member attached to the slider 2.

However, in the prior art linear guide apparatus, in each of the ball rolling grooves 3 and 4, flank faces F near the side edges of the groove are respectively connected to boundary ridge portions between the flank faces F and the land faces R of both groove banks through chamfered faces C having a slant angle of 45 degrees.

As a result, since the boundary ridge portion is formed with an angle edge, the following problems are encountered.

In the case where a moment load is applied to the slider 2 in a rolling direction, pinching or prying results between the guide rail 1 and the slider 2 and, when the balls B are held at the angle edge, the stress is concentrated and the contact surface pressure is locally increased (edge load). Thus, abnormal wear is caused and fatigue peeling is apt to result due to repeated stress.

Further, at the time of assembling the linear guide apparatus, the balls B hit the angle edge causing scratches on the balls B.

SUMMARY OF THE INVENTION

It is an object of the invention to provide a linear guide apparatus having ball rolling grooves with no angle edges formed therein.

In order to achieve this object, in a linear guide apparatus including an elongated guide rail having axial ball rolling grooves formed in both side surfaces in parallel to one another, a slider main body is mounted on the guide rail for movement in the axial direction and has ball rolling grooves formed in an inner surface respectively opposing the ball rolling grooves of the guide rail. The slider main body also has ball return paths formed in the side walls in parallel with the ball rolling grooves of the slider main body. End caps are respectively joined to opposite ends of the slider main body. Each of the end caps has curved paths of a half circular shape for bringing the ball return paths into communication with the ball rolling grooves. Many balls are rollably inserted into the opposing ball rolling grooves and the ball return paths, and the curved paths. The present invention comprises the improvement in which each of the ball rolling grooves of the guide rail and the slider main body has a boundary ridge portion formed in a circular arc shape connected continuously between a groove flank face and a land face.

In each of the ball rolling grooves of the guide rail and the slider main body, since the boundary ridge portion between the groove flank face and the land face is formed in a circular arc shape connected continuously therebetween, an angle edge is not formed. As a result, even when pinching or prying occurs between the guide rail and the slider main body during use of the linear guide apparatus, it is difficult to cause abnormal wear and fatigue peeling due to an edge load.

Furthermore, at the time of assembling the linear guide apparatus, there is no fear of causing scratches on the balls B since the balls B do not hit an angle edge.

BRIEF DESCRIPTION OF THE DRAWINGS

The drawings show an embodiment of the invention in which:

FIG. 1 is a front elevational view of a linear guide apparatus with a right half portion of an end cap being cut away;

FIG. 2 is a side elevational view with a part in cross section;

FIG. 3 is a front elevational view of the guide rail;

FIG. 4 is an enlarged view of a portion of the ball rolling groove shown in FIG. 3;

DESCRIPTION OF THE PREFERRED EMBODIMENT

Figure 5:
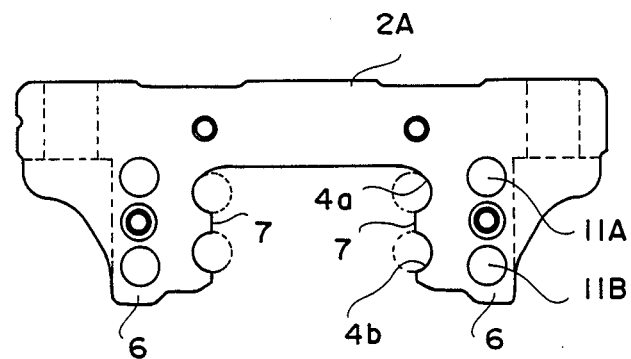
FIG. 5 is a front elevational view of the slider main body.
Figure 6:
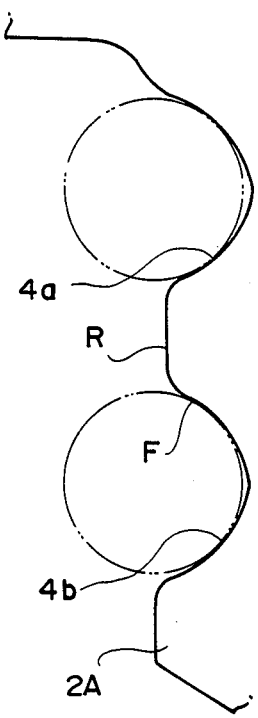
FIG. 6 is an enlarged view of a portion of the ball rolling groove shown in FIG. 5.
Figure 7:
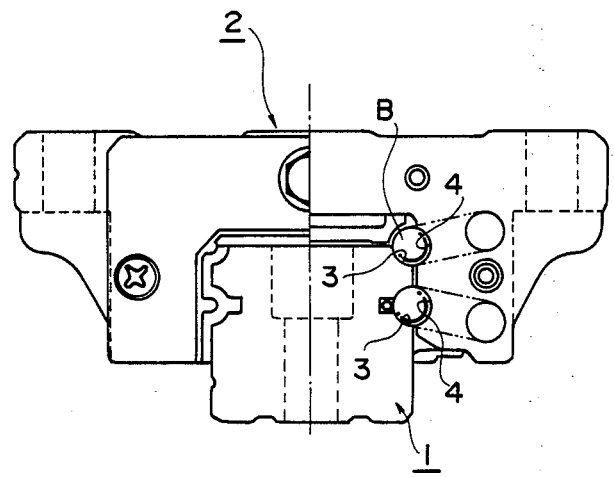
FIG. 7 is a front elevational view of a prior art linear guide apparatus with a right half portion of an end cap being cut away.
Figure 8:
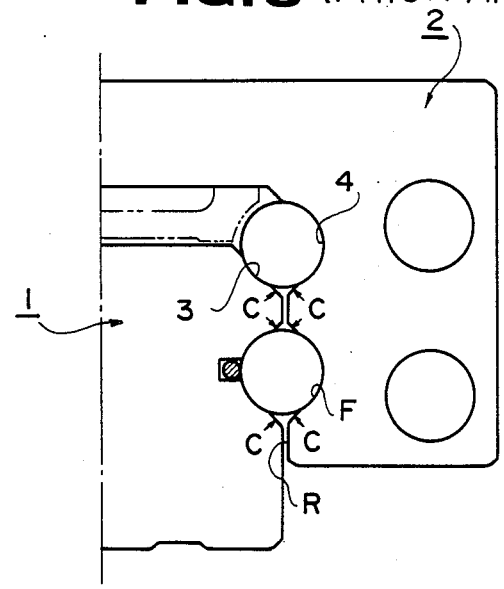
FIG. 8 is an enlarged front elevational view of a portion of the ball rolling groove shown in FIG. 7.

FIGS. 1 to 6 show an embodiment of the invention in which identical parts to those shown in FIGS. 7 and 8 are designated by identical reference numerals.

A guide rail 1 has axially extending, parallel upper and lower ball rolling grooves 3a and 3b formed in each side surface. A slider 2 having an inverted U-shaped cross section is mounted on the guide rail 1 for movement in the axial direction relative to the guide rail 1. The upper ball rolling grooves 3a of the guide rail 1 are formed in both side edges of an upper surface 1b of the guide rail 1 at which the upper surface 1b intersects both side surfaces 1a and 1a. Each of the upper ball rolling grooves 3a has a substantially quarter circular cross section. The lower ball rolling grooves 3b are formed respectively at intermediate positions of the side surfaces 1a of the guide rail 1 and have a substantially half circular cross section. Each of the lower ball rolling grooves 3b has an escape channel 5 formed in the bottom surface along the axial direction for a wire shaped ball retainer W which prevents the balls B from falling out of the ball rolling groove 3b.

On the other hand, a slider main body 2A of the slider 2 has, in an inner surface of each side wall 6, an upper ball rolling groove 4a corresponding to the upper ball rolling groove 3a of the guide rail 1, and a lower ball rolling groove 4b corresponding to the lower ball rolling groove 3b of the guide rail 1.

An upper ball rolling path 10A is formed by the corresponding upper ball rolling groove 3a of the guide rail 1 and the upper ball rolling groove 4a of the slider main body 2A. Similarly, a lower ball rolling path 10B is formed by the corresponding lower ball rolling groove 3b of the guide rail 1 and the lower ball rolling groove 4b of the slider main body 2A.

In each groove of the upper and lower ball rolling grooves 3a and 3b of the guide rail 1 and the upper and lower ball rolling grooves 4a and 4b of the slider main body 2A, a boundary ridge portion between a flank face F and a land face R is formed in a smoothly continuous circular arc shape instead of a chamfer C in the prior art linear guide apparatus as shown in FIGS. 4 and 6. This circular arc shape is formed by grinding work using a formed grinding wheel, FIGS. 9A and 9C, which is formed by a rotary dresser, FIG. 9B.

Figure 9A:
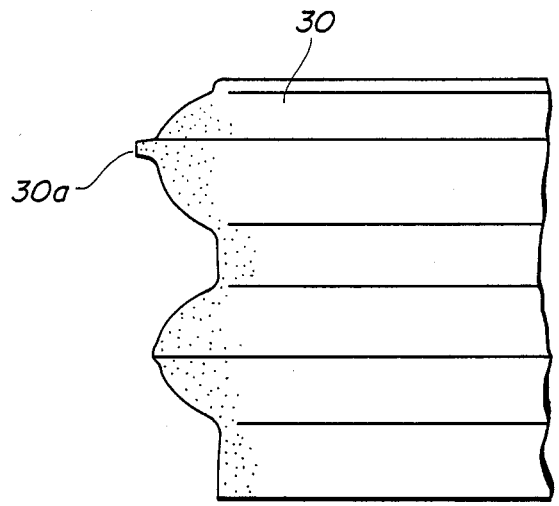
FIGS. 9A and 9C are longitudinal cross sectional views of formed grinding wheels.

Specifically, the upper and lower ball rolling grooves 3a and 3b on one side of the guide rail 1 are ground and chamfered simultaneously by using a formed grinding wheel 30 shown in FIG. 9A. As a result, the grinding of the land faces R and the groove flank faces F, and the chamfering of the boundary edges between the upper surface 1b and the adjacent groove flank face F, and between the groove flank face F and the land face R are performed simultaneously. Accordingly, no angled or edge portions remain at the boundary portions between the upper surface 1b and the groove flank face F, and between the groove flank face F and the land face R.

Conventionly, the chamfer has been effected by draw machining or cutting and grinding has not been employed. As a result, an angled portion is inevitably formed on the boundary between the ground surface and the surface (generally called a mill scale) machined in the preceding process.

Figure 9B:
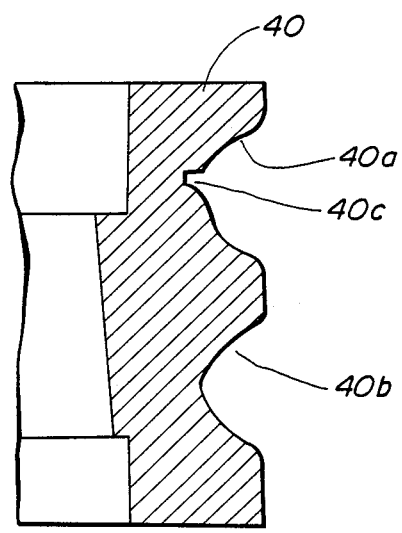
FIG. 9B is a longitudinal cross sectional view of a rotary dresser.
Figure 9C:
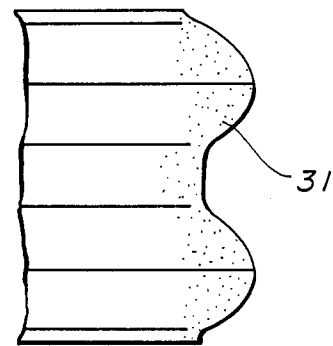

The upper and lower ball rolling grooves 4a and 4b of the slider main body 2A are also ground and chamfered simultaneously by a formed grinding wheel 31 shown in FIG. 9C.

A rotary dresser 40 for forming the grinding wheel 30 for the guide rail 1 is shown in FIG. 9B. In view of the fact that the upper ball rolling groove 3a of the guide rail 1 has a quarter circular cross section, it will be sufficient if an upper groove 40a of the rotary dresser 40 has a quarter circular cross section. However, the upper groove 40a of the rotary dresser 40 is formed with a half circular cross section. Thus, it is facilitated to measure a pitch between the upper and lower grooves 4a and 4b. Furthermore, a channel 40c is formed, and hence, a projection 30a is formed on the grinding wheel 30 thereby to chamfer the boundary edge between the upper surface 1b and the flank face F of the guide rail (FIG. 4). Another advantage of the grinding wheel 30 is that since the upper and lower ball rolling grooves 3a and 3b are ground simultaneously, even when it is difficult to measure a groove width between both the upper ball rolling grooves 3a and 3a, the groove width between both the lower ball rolling grooves 3b and 3b can be measured by inserting the two balls into the grooves 3b and 3b respectively and measuring the distance between the outer surfaces of the balls.

In this respect, as to the upper ball rolling groove 3a (having the quarter circular cross section) of the guide rail 1, the boundary ridge portion between the flank face F of the groove and the upper surface 1b of the guide rail 1 may be formed by aa different machining process.

The slider main body 2A has, in a thick wall portion of each side wall 6, an upper ball return path 11A having a circular cross section and penetrating axially in parallel with the upper ball rolling path 10A, and a lower ball return path 11B of a similar through bore in parallel with the lower ball rolling path 10B.

End caps 15 are respectively joined to opposite ends of the slider main body 2A. Each end cap 15 has upper and lower curved paths (not shown) curved in a half doughnut shape. The upper curved path is connected to the upper ball rolling path 10A and the upper ball return path 11A, and the lower curved path is connected to the lower ball rolling path 10B and the lower ball return path 11B.

Accordingly, an infinite ball circulating route formed by the upper ball rolling path 10A, the upper ball return path 11A, and the upper curved path, and another infinite ball circulating route formed by the lower ball rolling path 10B, the lower ball return path 11B, and the lower curved path are formed in each side of the guide rail 1 sandwiching the guide rail 1 symmetrically to each other. Many balls B are rollably inserted in each of the ball circulating routes.

A ball retainer 17 having a flat plate shape and made of a synthetic resin is mounted to the inner surface side of the slider main body 2A with axial opposite ends of the ball retainer 17 supported respectively in supporting holes (not shown) formed in the end caps 15. The ball retainer 17 holds the balls B in the upper ball rolling grooves 4a of the slider 2.

Furthermore, as shown in FIGS. 1 and 2, a feed oil nipple 20 is attached to the end cap 15. A spare attaching hole 20A is formed to facilitate a change of the attaching position of the feed oil nipple 20.

Reference numeral 21 designates a fixing screw for fixing the end cap 15 to the slider main body 2A, and reference numeral 22 designates a screw bore for the screw 21.

An inserting bore 23 is formed for a bolt to secure the guide rail 1 to a base (not shown) or the like when the linear guide apparatus is to be used. A through bore 24 is formed in the slider 2 to secure a member to be driven, such as a table or the like, to the slider 2 with a bolt.

Furthermore, a wiper seal 25 made of a synthetic rubber is attached to the end cap 15. The wiper seal 25 wipes each of the ball rolling grooves 3a and 3b to interrupt the intrusion of foreign particles into the grooves.

Next, the operation of the embodiment of the invention will be described.

The balls B are loaded into the upper ball rolling groove 4a of the slider 2 by pushing and opening a side edge of the ball retainer 17. Also, the balls B are loaded into the lower ball rolling groove 4b of the slider 2 by pushing and opening the retainer W having a wire shape. Thereafter, the slider 2 is assembled to the guide rail 1.

In each of the ball rolling grooves 3a, 3b, 4a, and 4b of the guide rail 1 and the slider main body 2A, the boundary ridge portion between the groove flank face F and the land face R is formed in the smooth continuous circular arc shape and no angle edge exists therein. As a result, at the time of assembling the linear guide apparatus, no scratches are caused on the balls B as previously caused by the balls B hitting the angle edge in the prior art apparatus.

In using the linear guide apparatus, the guide rail 1 is secured to a base or the like of a machine tool (not shown), and a member to be driven, such as a table, is secured to the slider 2 which is assembled to the guide rail 1. When the member to be driven is moved together with the slider 2 in the axial direction of the guide rail 1, the balls B inserted in the upper (lower) ball rolling groove 10A (10B) roll with the movement of the slider 2 and are moved with respect to the slider 2 in a direction opposite to the movement direction of the slider 2. At an end of the slider 2, the balls B make a U-turn along the upper (lower) curved path of the end cap 15.

Subsequently, the balls B pass through the upper (lower) ball return path 11A (11B) of the slider main body 2A to reach the end cap 15 at the opposite end. In this end cap 15, the balls B again make a U-turn along the upper (lower) curved path, and return to the upper (lower) ball rolling path 10A (10B) to repeat circulation.

During use of the linear guide apparatus, even when a moment load is applied to the slider 2 in a rolling direction resulting in pinching or wrenching between the guide rail 1 and the slider 2, since the boundary ridge portion between the groove flank face F and the land face R in each of the ball rolling groves 3a, 3b, 4a and 4b is formed in the smooth circular arc shape, it is possible to prevent abnormal wear and fatigue peeling due to an edge load at the boundary ridge portion and the balls B.

In the present invention, as described in the foregoing, since the boundary ridge portion between the groove flank face and the land face in each of the ball rolling grooves of the guide rail and the slider is made in a continuous circular arc shape, the following advantages are obtained.

During use of the linear guide apparatus, even when pinching or wrenching occurs between the guide rail and the slider, abnormal wear and fatigue peeling due to the edge load can be prevented.

Furthermore, at the time of assembling the linear guide apparatus, there is no fear of causing scratches on the balls B by hitting an angle edge of the slider main body 2A.

Moreover, since each ball rolling groove, chamfer, and land portion are formed to a continuous smoothly ground surface, the durability and the sealing property of the wiper seal is improved. In the prior art apparatus, the wiper seal is worn due to the existence of a mill scale in the chamfer.

What is claimed is:

1. In a linear guide apparatus including an elongated guide rail having axial ball rolling grooves formed in both side surfaces in parallel to one another, a slider main body mounted on said guide rail for movement in an axial direction and having ball rolling grooves formed in an inner surface respectively opposing the ball rolling grooves of said guide rail, said slider main body also having ball return paths formed in side walls thereof in parallel to the ball rolling grooves in the inner surface of the slider main body, end caps respectively joined to opposite ends of said slider main body, each of said end caps having curved paths of a half circular shape for bringing the ball return paths into communication with the ball rolling grooves, and a plurality of balls rollably inserted into the opposing ball rolling grooves, the ball return paths, and the curved paths, the improvement comprising:

a boundary ridge portion formed in each of the ball rolling grooves of said guide rail and said slider main body between a groove flank face and a land face, the boundary ridge portion being formed in a circular arc shape continuously connecting the groove flank face and the land face.

2. The linear guide apparatus according to claim 1, wherein the grinding and chamfering of the upper and lower ball rolling grooves, the boundary ridge portion, the land face, and the flank face of each side of said guide rail are performed simultaneously by a formed grinding wheel.

3. The linear guide apparatus according to claim 2, wherein the grinding and chamfering of the upper and lower ball rolling grooves, the boundary ridge portion, the land face and the flank face of each side wall of said slider main body are performed simultaneously by a formed grinding wheel.

* * * * *